J. J. CRISSINGER.
NUT LOCK.
APPLICATION FILED SEPT. 24, 1919.
1,353,382.
Patented Sept. 21, 1920.
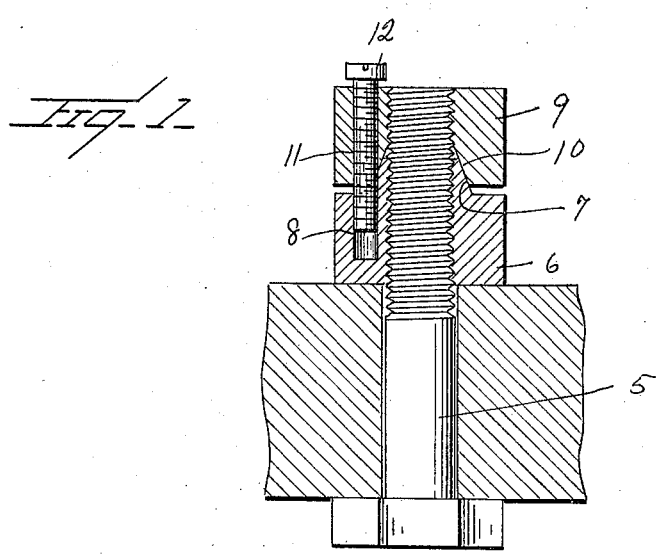
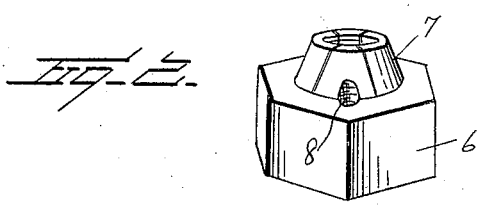
Inventor
J. J. Crissinger
By Watson E. Coleman
Attorney

UNITED STATES PATENT OFFICE.

JOSEPH J. CRISSINGER, OF GREENSBURG, PENNSYLVANIA.

NUT-LOCK.

1,353,382.  Specification of Letters Patent.  Patented Sept. 21, 1920.

Application filed September 24, 1919. Serial No. 325,930.

*To all whom it may concern:*

Be it known that I, JOSEPH J. CRISSINGER, a citizen of the United States, residing at Greensburg, in the county of Westmoreland and State of Pennsylvania, have invented certain new and useful Improvements in Nut-Locks, of which the following is a specification, reference being had to the accompanying drawings.

This invention relates to nut locks, and has for its object to provide a device of this character comprising a securing nut including a projection which serves as a clamp for binding engagement with the bolt.

Another object of the invention is to provide a locking device which not only securely locks the nut to the bolt but carries an additional locking means for securing the locking device to the nut, thereby producing a double locking action.

Another object is to provide a locking device which locks the nut firmly on the bolt through the medium of a locking pin carried by said locking device.

In the drawings:

Figure 1 is a sectional view of the invention applied to a bolt and in its locked position; and Fig. 2 is a perspective view of the locking device showing the split cone and the opening penetrating the inclined surface of the cone.

The invention consists of a bolt 5 on which is threaded a nut 6. This nut is reduced at one end to provide a split cone 7 which is intended to firmly grip the bolt 5 in the locking operation. The split cone 7 is provided with a threaded opening 8 which extends transversely of the split cone 7 and penetrates the cone at its base. A portion of the threads of this opening, penetrates the exterior surface of the split cone, and is intended to receive one end of a locking member to be more fully described hereinafter.

A locking device 9 is threaded on the bolt 5 and has a conical recess 10 which extends from the central portion of the locking device and is intended to receive the split cone 7 of the nut. Extending transversely of the locking device 9 is a threaded opening 11 which pierces one edge of the recess 10. A portion of the threads of the opening 11 penetrate the interior surface of the conical recess 10 and is intended to register with the opening 8 when the locking device has reached the limit of its engaging movement with the split cone 7. A locking screw 12 is threaded through the opening 11 and into the opening 8 and is intended to hold the locking device in its binding engagement with the split cone 7.

In operation, after the nut 6 has been screwed up firmly on the bolt 5, the locking device is screwed up on the bolt and engaged with the split cone 7. When the locking device reaches the limit of its binding engagement with the split cone 7, the openings 8 and 11 will register. To eliminate danger of vibration, releasing the binding action of the split cone and the locking device, the locking screw 12 is screwed through the locking device and nut, through the openings 8 and 11 thereby making disengagement impossible. The nut does not depend entirely on the binding action of the locking device with the cone, but is further locked by the locking pin binding the split portion of the cone containing the opening 8, on the bolt.

Another important locking feature is that when the nut 6 is applied to the end of the bolt, the locking device may also be rotated on the end of the bolt to permit the openings 8 and 11 to register with the locking device as near as possible to the nut. The locking pin is then screwed into the opening 8 so as to connect the nut and locking device without causing the latter to bind on the cone. Both the nut and the locking device can then be simultaneously rotated so as to save time and labor. When the nut reaches the desired position on the bolt, the locking pin is screwed into the nut 6 until it reaches the limit of its movement through the locking device, and through the coöperation of the nut binds the locking device on the bolt. By this novel construction, three distinct locking actions are provided which hold the nut in engagement with the bolt indefinitely.

The device is also capable of performing another locking function which is accomplished by rotating the locking device 9 on the bolt until it reaches a position closely adjacent but not in engagement with the nut 6 so as to bring the threaded openings 8 and 11 in registration. The locking screw 12 is then screwed through the locking device 9 and partially into the nut 6. This portion of the operation may be performed either after the nut 6 is in engagement with its work at the limit of its movement, or after the nut and locking device are applied to the end of the bolt so they may be rotated as a unit until the nut 6 engages the work. The locking screw is then screwed into the nut 6 to the limit of its movement, that is until the head of the screw comes in contact with the locking device 9. This causes the locking device to be canted on the bolt and also forces the portion of the split cone through which the locking screw passes, into binding engagement with the bolt.

What is claimed is:—

A nut lock of the character described comprising a bolt, a nut operable thereon and including a split cone having a threaded opening which extends into the nut, a locking device having a conical recess, said locking device being arranged to engage the split cone without binding said cone on the bolt, and a locking screw connecting the nut and the locking device for simultaneous rotation on the bolt, the head of the locking screw being screwed into engagement with the locking device to simultaneously cant the locking device on the bolt and force a portion of the split cone into binding engagement with the bolt, the end of the locking screw being disposed in spaced relation to the end wall of the threaded opening in the nut.

In testimony whereof I hereunto affix my signature.

JOSEPH J. CRISSINGER.